E. M. McKISSICK.
COTTON CHOPPER AND CULTIVATOR.
APPLICATION FILED AUG. 30, 1910.
989,991.
Patented Apr. 18, 1911.
2 SHEETS—SHEET 1.
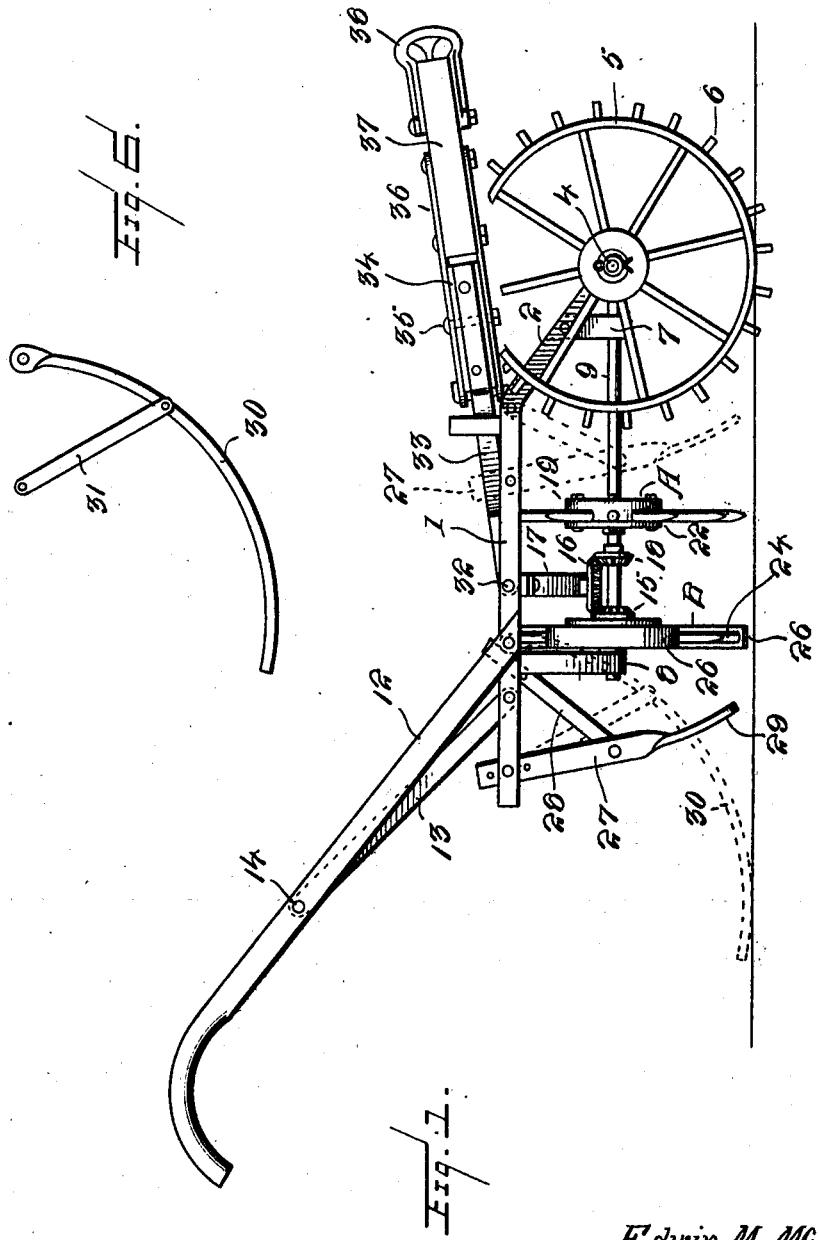
Witnesses
E. R. Rulphut.
Wm. Bagger.
Inventor
Edwin M. McKissick
By Victor J. Evans
Attorney E. M. McKISSICK.
COTTON CHOPPER AND CULTIVATOR.
APPLICATION FILED AUG. 30, 1910.
989,991.
Patented Apr. 18, 1911.
2 SHEETS—SHEET 2.
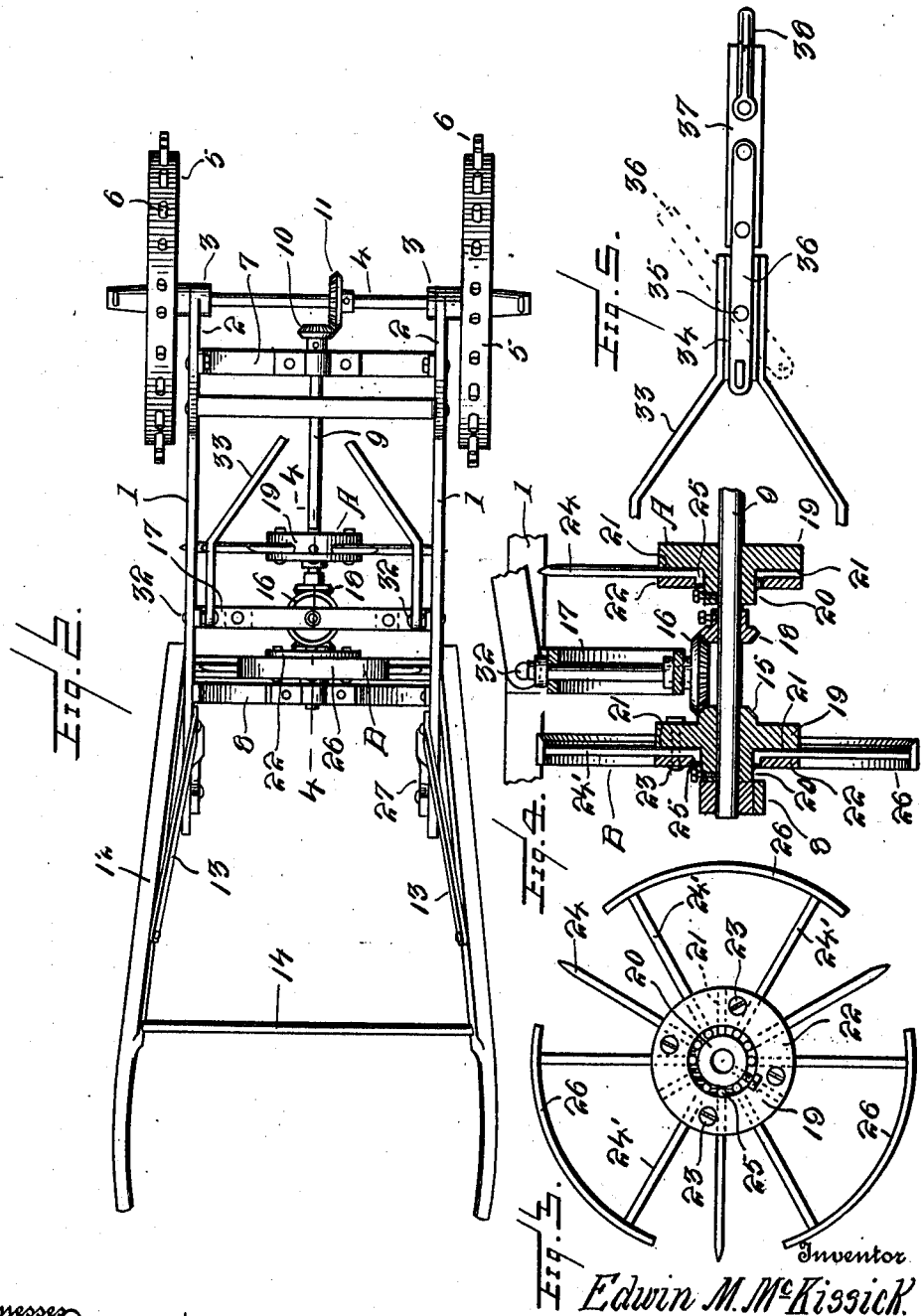
Witnesses
E. R. Rupfut.
Wm Bagger.
Inventor
Edwin M. McKissick.
By Victor J. Evans
Attorney

UNITED STATES PATENT OFFICE.

EDWIN M. MCKISSICK, OF COLUMBUS, MISSISSIPPI.

COTTON CHOPPER AND CULTIVATOR.

989,991.         Specification of Letters Patent.     Patented Apr. 18, 1911.

Application filed August 30, 1910. Serial No. 579,658.

*To all whom it may concern:*

Be it known that I, EDWIN M. MCKISSICK, a citizen of the United States of America, residing at Columbus, in the county of Lowndes and State of Mississippi, have invented new and useful Improvements in Cotton Choppers and Cultivators, of which the following is a specification.

This invention relates to cotton choppers and cultivators, and it has for its object to produce a machine of simple and inexpensive construction which may be efficiently utilized for weeding and cultivating cotton and other crops at various stages of growth and which by slight alteration in the arrangement of the working parts may be efficiently utilized for chopping cotton to leave stands of suitable size the desired distance apart.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations, and modifications within the scope of the invention may be resorted to when desired.

In the drawings,—Figure 1 is a side elevation of a machine constructed in accordance with the invention. Fig. 2 is a top plan view, a portion of the draft element having been removed to expose the underlying construction. Fig. 3 is a detail side elevation of the chopping wheel. Fig. 4 is a longitudinal vertical sectional view taken on the line 4—4 in Fig. 2. Fig. 5 is a detail plan view of a portion of the draft element. Fig. 6 is a detail side view showing a drag member detached.

Corresponding parts in the several figures are denoted by like characters of reference.

The frame of the improved machine is composed of side members 1, 1, the front ends of which are bent downwardly forming brackets 2 equipped with bearings 3 for a shaft 4 carrying the transporting wheels 5 which may be provided with earth engaging spurs 6, as shown. The side members of the frame are connected together by front and rear cross bars 7, 8 affording bearings for a longitudinal shaft 9 having at its front a bevel pinion 10 meshing with a bevel gear 11 upon the shaft or axle 4. Handles 12 reinforced by braces 13 and connected by a rung 14 are suitably connected with the side members of the frame adjacent to the rear end of the latter. The shaft 9 carries the weeding wheel A and the chopping wheel B, the construction of each of which will be presently more fully described. The weeding wheel A is fixed upon the shaft and rotates therewith, while the chopping wheel B is fitted to revolve loosely upon the shaft, said chopping wheel being provided with a bevel pinion 15 meshing with a horizontally disposed bevel gear 16 which is supported for rotation upon a brace 17, the ends of which are connected with the side members of the frame from which the said brace is offset downwardly, as will be best seen in Fig. 1. The bevel gear 16 also meshes with a bevel pinion 18 which is fixed upon the shaft 9 with which it revolves, thus transmitting rotary motion in a reverse direction to the chopping wheel B through the medium of the bevel gear 16.

The weeding wheel and the chopping wheel are each composed of a plate or disk 19 having a hub 20 whereby it is mounted upon the shaft 9. The hub 20 extends only in one direction from the plate or disk 19, and the face of said disk or plate adjacent to the hub is provided with a plurality of radially disposed grooves 21. A washer disk 22 is capable of being secured detachably upon the radially grooved face of the disk 19 by fastening means, such as screws or bolts 23. Teeth or spokes 24 may be mounted in the radial grooves of the disk 19, said teeth or spokes being provided at their inner ends with laterally extending hooks 25 that may be accommodated in the space between the exterior of the hub 20 and the inner wall of the washer 22, thereby preventing longitudinal displacement of said teeth or spokes which will thus be held very securely in position by means of the washer disk.

The disk or plate 19 of each wheel may be provided with any desired number of radial grooves, and the teeth or spokes may be arranged in said grooves at any desired intervals. In the weeding wheel these radial members are preferably in the form of sharp pointed teeth which by the rotation of the wheel will engage the ground to stir or agitate the soil and to pull or lift the weeds which may be growing in the vicinity of the row of plants that is being operated upon. In the chopping wheel sharp pointed teeth may be used at intervals, as shown in Fig. 3, but some of the radial members, here specially designated 24', may be in the nature of spokes carrying at their outer ends the curved or arcuate chopping blades or hoes 26, the front edges of which may be sharpened. The sharp pointed teeth 24 may be used at intervals between the hoes 26, as shown in Fig. 3, but these intermediate teeth may be dispensed with, and it will be understood that the hoes or chopping blades may be of any desired length commensurate with the dimensions of the machine and that the spaces between said hoes or chopping blades may be regulated accordingly.

Suitably connected with the side members of the frame adjacent to the rear ends thereof are standards 27 reinforced by braces 28, said standards having feet 29 upon which cultivator blades or shovels of well known construction may be mounted. Similar standards may be mounted adjacent to the front end of the frame, as shown in dotted lines in Fig. 1. In place of the rear cultivator standards there may be used drag members, one of which has been illustrated at 30 in Fig. 6 of the drawings, said drag member being equipped with a brace 31; dotted lines in Fig. 1 serve to indicate the position of said drag member when used.

Pivotally mounted upon the bolts 32 whereby the brace member 17 is secured in position upon the frame are angle bars 33 which converge forwardly and between which a block 34 is suitably connected. Pivotally mounted upon the said block adjacent to its upper and lower faces by means of a bolt 35 are straps 36 between which the tongue or draft member 37 is mounted, said draft member being equipped with a clevis 38 for the attachment of the draft. It will be readily seen that the straps 36 carrying the tongue between them may be swung laterally with relation to the block 34, and that the entire draft attachment including said block, the angle bars 33, the straps 36 and the tongue 37 may be swung or moved in an approximately vertical plane about the axis of the bolts 32.

From the foregoing description, taken in connection with the drawings hereto annexed, the operation and advantages of this invention will be readily understood by those skilled in the art to which it appertains. The improved machine is of extremely simple and light construction, and it will be found to be of exceptionally light draft. Owing to the flexibility of the draft attachment, the machine may be readily steered in the desired direction or turned about when required. The frame structure is extremely simple and efficient for the purposes of the invention. The weeding wheel and the chopping wheel may be used simultaneously or independently of each other, and the hoes may be removed from the chopping wheel, and earth engaging teeth may be substituted if so desired. It is also evident that the hoe blades may be changed or adjusted to various positions and that blades of any desired dimensions may be used. The cultivator standards carrying blades or shovels of well known construction may be used in connection with the weeding wheel or the chopping wheel, or with both, or they may be detached, and the drag members may be substituted, said drag members being principally used when cultivator standards are placed adjacent to the front end of the frame, as indicated in dotted lines in Fig. 1. In short, it is desired to be understood that the various elements constituting this invention may be transposed and rearranged in any manner that may be deemed suitable or advantageous with regard to the end in view and the result to be obtained.

Having thus described the invention, what is claimed as new, is:—

1. In a cultivator, a frame, a transversely disposed axle at the front end of the frame, carrying wheels upon said axle, a longitudinally disposed shaft supported for rotation in the frame, beveled gearing transmitting motion from the axle to the shaft, wheels upon said shaft having radially extending earth engaging members, one of said wheels being loose and the other wheel being fixed upon the shaft, and means for transmitting motion from the fixed wheel to the loose wheel.

2. In a machine of the character described, a frame having rotary supporting means, a longitudinal shaft, means for transmitting motion from the rotary supporting means to the shaft, wheels carried by said shaft and having radially extending earth engaging members, one of said wheels being fixed upon the shaft and the other being loose, and means for transmitting motion in a reverse direction from the fixed wheel to the loose wheel.

In testimony whereof I affix my signature in presence of two witnesses.

EDWIN M. MCKISSICK.

Witnesses:
D. D. RICHARDS,
F. W. HARRIS.